(12) United States Patent
Escalier et al.

(10) Patent No.: US 12,529,916 B2
(45) Date of Patent: Jan. 20, 2026

(54) METHOD AND SYSTEM FOR DETERMINING A FITTED POSITION OF AN OPHTHALMIC LENS WITH RESPECT TO A WEARER REFERENTIAL AND METHOD FOR DETERMINING A LENS DESIGN OF AN OPHTHALMIC LENS

(71) Applicant: Essilor International, Charenton-le-Pont (FR)

(72) Inventors: Guilhem Escalier, Charenton-le-Pont (FR); Thierry Bonnin, Charenton-le-Pont (FR); Samy Hamlaoui, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 686 days.

(21) Appl. No.: 17/787,285

(22) PCT Filed: Dec. 15, 2020

(86) PCT No.: PCT/EP2020/086266
§ 371 (c)(1),
(2) Date: Jun. 17, 2022

(87) PCT Pub. No.: WO2021/122629
PCT Pub. Date: Jun. 24, 2021

(65) Prior Publication Data
US 2023/0046843 A1 Feb. 16, 2023

(30) Foreign Application Priority Data
Dec. 19, 2019 (EP) .................................... 19306710

(51) Int. Cl.
*G02C 13/00* (2006.01)
*G06T 7/60* (2017.01)
*G06T 7/73* (2017.01)

(52) U.S. Cl.
CPC .............. *G02C 13/005* (2013.01); *G06T 7/60* (2013.01); *G06T 7/73* (2017.01); *G06T 2200/04* (2013.01);
(Continued)

(58) Field of Classification Search
CPC ........ G02C 13/005; G02C 7/027; G06T 7/60; G06T 7/73; G06T 2200/04; G06T 2207/30041; G06T 2207/30201
(Continued)

(56) References Cited

U.S. PATENT DOCUMENTS

| 8,439,500 | B2 | 5/2013 | Dubois et al. |
| 10,330,958 | B2 | 6/2019 | Fonte et al. |

(Continued)

FOREIGN PATENT DOCUMENTS

| CN | 1321564 A | 11/2001 |
| CN | 101960360 A | 1/2011 |

(Continued)

OTHER PUBLICATIONS

Combined Chinese Office Action and Search Report issued Dec. 26, 2023 in Chinese Application No. 202080080601.1, 10 pgs.
(Continued)

*Primary Examiner* — Balram T Parbadia
*Assistant Examiner* — Rahman Abdur
(74) *Attorney, Agent, or Firm* — Oblon, McClelland, Maier & Neustadt, L.L.P.

(57) ABSTRACT

A method for determining a fitted position of an ophthalmic lens to be mounted on a spectacle frame equipping a wearer, the fitted position being defined with respect to a wearer referential linked to the head of the wearer. The method includes defining at least one fitting criteria relating to the positioning of the ophthalmic lens with respect to the spectacle frame, determining frame 3D data at least partially
(Continued)

representative of the geometry and position of the spectacle frame with respect to the wearer referential, determining lens 3D data at least partially representative of the geometry of at least a peripheral portion of the ophthalmic lens, and determining the fitted position of said ophthalmic lens with respect to the wearer referential using the frame 3D data and said lens 3D data to fit the ophthalmic lens within the spectacle frame meeting the fitting criteria.

13 Claims, 2 Drawing Sheets

(52) U.S. Cl.
CPC ............... *G06T 2207/30041* (2013.01); *G06T 2207/30201* (2013.01)

(58) Field of Classification Search
USPC ........................................................ 351/204
See application file for complete search history.

(56) References Cited

U.S. PATENT DOCUMENTS

| | | |
|---|---|---|
| 10,345,618 B1 | 7/2019 | Rego et al. |
| 2010/0283967 A1 | 11/2010 | Dubois et al. |
| 2010/0293069 A1 | 11/2010 | Freson et al. |
| 2016/0299360 A1 | 10/2016 | Fonte et al. |
| 2016/0327813 A1 | 11/2016 | Baranton et al. |
| 2018/0017815 A1 | 1/2018 | Chumbley et al. |
| 2018/0067340 A1 | 3/2018 | Chumbley et al. |
| 2019/0108687 A1 | 4/2019 | Kelly et al. |
| 2019/0377201 A1 | 12/2019 | Fonte et al. |

FOREIGN PATENT DOCUMENTS

| | | |
|---|---|---|
| CN | 106738506 A | 5/2017 |
| CN | 109313707 A | 2/2019 |
| EP | 2 028 530 A1 | 2/2009 |
| JP | 6-74733 A | 3/1994 |
| WO | WO 2014/198894 A1 | 12/2014 |
| WO | WO 2016/176630 A1 | 11/2016 |
| WO | WO 2017/205903 A1 | 12/2017 |

OTHER PUBLICATIONS

Combined Chinese Office Action and Search Report issued on May 30, 2024 in Chinese Patent Application No. 202080080601.1 (with English translation), 9 pages.

International Search Report mailed on Feb. 19, 2021 in PCT/EP2020/086266 filed on Dec. 15, 2020, 4 pages).

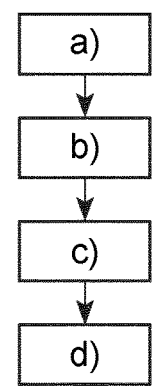
Fig.1
Fig.2
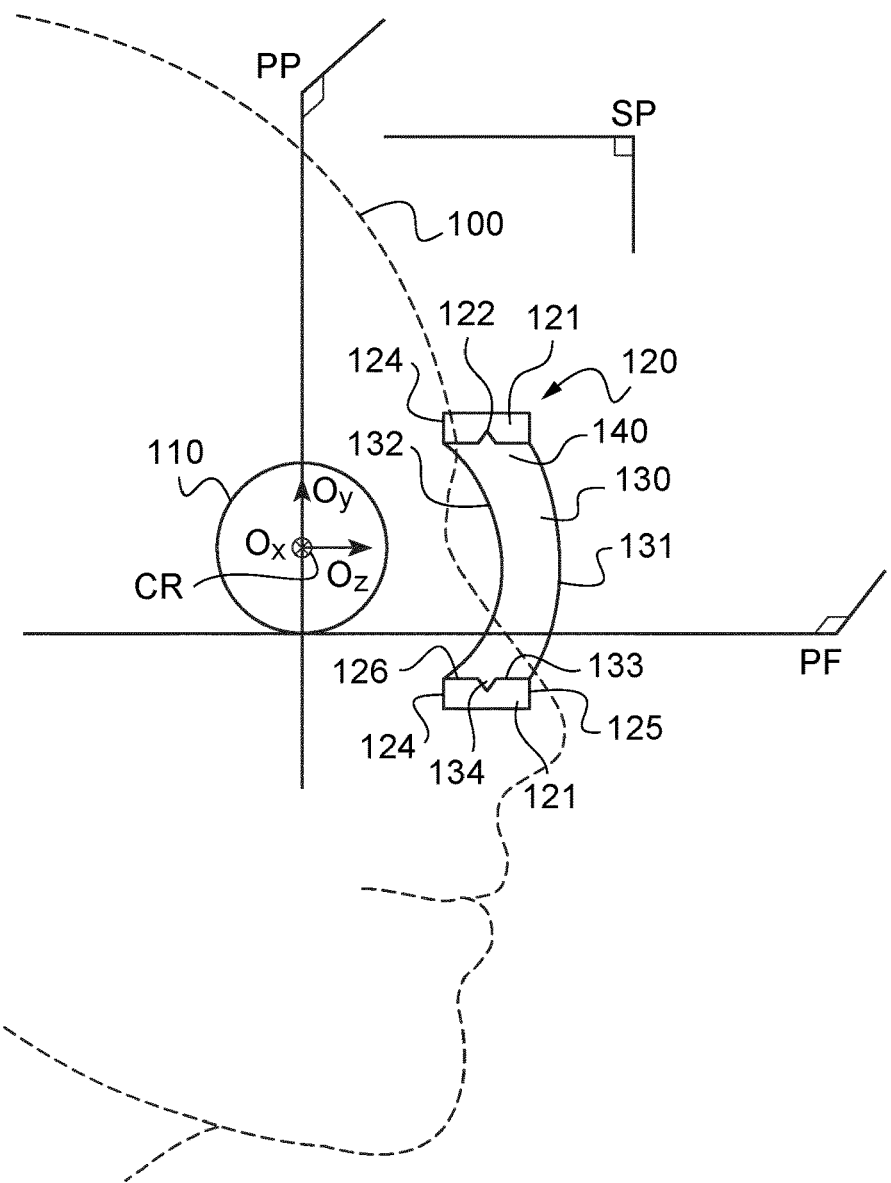

METHOD AND SYSTEM FOR DETERMINING A FITTED POSITION OF AN OPHTHALMIC LENS WITH RESPECT TO A WEARER REFERENTIAL AND METHOD FOR DETERMINING A LENS DESIGN OF AN OPHTHALMIC LENS

TECHNICAL FIELD OF THE INVENTION

The invention relates in general to the domain of ophthalmic optics.

More particularly, the invention relates to a method and a system for determining a fitted position of an ophthalmic lens to me mounted on a spectacle frame equipping a wearer. This fitted position of the ophthalmic lens is representative of an as-worn position when the ophthalmic lens is actually mounted on a spectacle frame chosen by the wearer.

The invention further concerns a method for determining the lens design of an ophthalmic lens.

The invention finally relates to an ophthalmic lens designed with such method.

BACKGROUND INFORMATION AND PRIOR ART

When optically designing a corrective ophthalmic lens, attempts are made nowadays to take better into account the position of the lens, with respect to the head and more precisely to the eye of the wearer, when the lens is mounted on the spectacle frame selected by the wearer. This position might depend, in part, on aesthetic reasons such as having as little as possible the peripheral edge of the lens visible from side view. In order to design the corrective ophthalmic lenses, the optician estimates this position as best with the resources he has.

For example, the position of the lens with respect to the wearer is important to provide him with a correct distribution of optical power for different gazing directions, i.e. with an optical design.

The position of a lens corresponds to a three-dimensional configuration which is determined by: i) the orientation of the lens relative to the corresponding eye of the wearer; and ii) the distance between the lens and the corresponding eye of the wearer.

In order to determine this three-dimensional configuration, the optician places a pair of presentation spectacle frame on the wearer's nose. Then, the optician measures manually a set of fitting parameters with the help of a small ruler. The set of fitting parameters usually comprises two angles for the orientation of the lens and one eye-lens distance.

Currently, the set of fitting parameters is measured with respect to a theoretical plane set against the back surface of the presentation spectacle frame. In practice, for example, this plane corresponds to an average plane of the rear contour of the rim of the spectacle frame. This method of measurement takes into account neither the shape nor curvature of the lens nor the axial position of the lens within the spectacle frame. Consequently, the fitting parameters obtained from this theoretical plan differ from the exact one that would have been measured with and already designed ophthalmic lens mounted on the spectacle frame. Therefore, such an approximation of the fitting parameters leads to significant errors that are highly penalizing for the pertinence of the personalized lens design calculation.

Moreover, the eye care professional might adjust the position of the bevel on the lens edge for aesthetic reasons. This has an impact on the future position of the lens.

Furthermore, even if the distance between the pupil and the lens is the most easily obtainable, it is not the magnitude that is the most pertinent when calculating a personalized lens design by ray tracing for the corrective lens. It is the position of the center of rotation of the eye that the designer desires to know in order to perform calculations properly.

In present practice, the position of the center of rotation of the eye is deduced approximately from the position of the cornea by assuming a mean value for the radius of the eye (typically a value of about 15 millimeters). Unfortunately, the radius of the eye varies significantly from one individual to another, such that this approximation also leads to errors in the lens design calculation.

SUMMARY OF THE INVENTION

Therefore, one object of the invention is to estimate precisely an as-worn position of an ophthalmic lens to be mounted on a spectacle frame chosen by the wearer.

To this end, the present invention proposes a method for determining a fitted position of an ophthalmic lens to be mounted on a spectacle frame equipping a wearer, said fitted position being defined with respect to a wearer referential linked to the head of the wearer, said method comprising steps of:
 defining at least one fitting criteria relating to the axial positioning of said ophthalmic lens with respect to said spectacle frame;
 determining frame 3D data at least partially representative of the geometry and position of said spectacle frame with respect to said wearer referential XYZ;
 determining lens 3D data at least partially representative of the geometry of at least a peripheral portion of said ophthalmic lens;
 determining said fitted position of said ophthalmic lens with respect to said wearer referential using said frame 3D data and said lens 3D data to fit said ophthalmic lens within said spectacle frame meeting said fitting criteria.

By "axial positioning", it is meant the positioning along an axis substantially orthogonal to a mean plane of the lens, this axis can be, for example, the gaze direction of the eye of the wearer. In practice, the fitted position comprises data on a three-dimensional configuration, similar to the one presented in introduction, describing the position of the ophthalmic lens with respect to the wearer's head and therefore with respect to his eye.

Thanks to the method according to the invention, it is possible to obtain the fitted position of the ophthalmic lens corresponding accurately to an as-worn position after the ophthalmic lens has been mounted on the spectacle frame. This allows, for example, determining the fitting parameters more precisely than with manual measurements relative to a theoretical plan set against a back surface of the spectacle frame.

Advantageously, when said spectacle frame comprises a rim fitted with said ophthalmic lens, said frame 3D data include groove 3D data at least partially representative of the geometry and position of a spectacle frame groove provided inside said rim; said lens 3D data include bevel 3D data at least partially representative of the geometry and position of a bevel provided on a peripheral edge of said ophthalmic lens; and said fitted position can be defined using said groove 3D data and said bevel 3D data for fitting said bevel within said spectacle frame groove.

This way, the fitted position of the ophthalmic lens is even more accurate because its determination also takes into account the future engagement of the bevel into the spectacle frame groove.

Preferably, said groove 3D data are retrieved as a function of a default offset or a spectacle frame thickness inside said spectacle frame rim.

In a particular embodiment, said bevel 3D data are determined based on at least one of the following parameters: a front base curve of the ophthalmic lens, a thickness of a peripheral edge of the ophthalmic lens, and a spectacle frame base curve.

Other advantageous and non-limiting features of the method according to the invention are:
- said at least one fitting criteria comprises one of the following: flushing a front optical surface of said ophthalmic lens with the front face of the spectacle frame; and providing a predetermined overflow of the peripheral edge of the lens relative to the front face of the spectacle frame;
- said frame 3D data are determined using 3D data, acquired with a 3D scanner, of the wearer equipped with said spectacle frame;

The invention further proposes a method for determining a lens design of an ophthalmic lens adapted to correct the vision of a wearer, said method comprising the steps of:
- determining a fitted position of said ophthalmic lens to be mounted on a spectacle frame equipping the wearer according to the method for determining a fitted position of an ophthalmic lens previously described; and
- determining said lens design based on said fitted position of the ophthalmic lens with respect to said wearer referential.

Thus, the fitted position allows calculating a personalized lens design for the corrective ophthalmic lens.

According to an advantageous characteristic of the invention, the method can further comprise a step of determining the position of the rotation center of said eye of the wearer with respect to said wearer referential, wherein said position of the rotation center of the eye is used for determining said lens design of said ophthalmic lens.

Thanks to this additional step, calculating a personalized lens design can be done even more precisely since the three-dimensional configuration of the lens comprised in the fitted position and the position of the center of rotation of the eye are determined in the same referential linked to the head of the wearer.

Consequently, an ophthalmic lens requiring as few shape modifications as possible can be ordered and manufactured.

Other advantageous and non-limiting features of the method for determining a lens design are:
- said lens design is at least partially representative of the geometry of an optical surface of said ophthalmic lens and a refined value of at least one fitting parameter is determined based on said lens design;
- said lens design is determined based on at least one of the following: an eye-lens distance, a face form angle, and a pantoscopic angle; and
- the determination of the position of the rotation center of said eye of the wearer with respect to said wearer referential is determined using a 3D data, acquired with a 3D scanner, of the wearer's face; and
- said lens 3D data are updated based on said lens design and a second fitted position of the ophthalmic lens is determined based on the updated lens 3D data, this operation being advantageously repeated so as to build an iterative process.

The invention also relates to a system for determining a fitted position of an ophthalmic lens to be mounted on a spectacle frame equipping a wearer, said fitted position being defined with respect to a wearer referential linked to the head of the wearer, said system comprising:
- an input device adapted to determine:
  - frame 3D data at least partially representative of the geometry and position of said spectacle frame with respect to said wearer referential; and
  - lens 3D data at least partially representative of the geometry of at least a peripheral portion of said ophthalmic lens; and
- a processor programmed to determine said fitted position of said ophthalmic lens with respect to said wearer referential using said frame 3D data and said lens 3D data to fit said ophthalmic lens within said spectacle frame meeting a fitting criteria relating to the axial positioning of said ophthalmic lens with respect to said spectacle frame.

Advantageously, the input device is adapted to determine the position of the rotation center of said eye of the wearer with respect to said wearer referential; and the processor is programmed to determine a lens design of the lens based on said fitted position of the ophthalmic lens with respect to said wearer referential and the position of the rotation center of the eye is used for determining said lens design of said ophthalmic lens.

The invention finally relates to an ophthalmic lens to be fitted on a spectacle frame adapted to be disposed on the head of a wearer, in front of the eye of the wearer, wherein the determination of at least one geometrical or optical parameter of said ophthalmic lens is based on:
- a position of a rotation center of the eye of the wearer with respect to said referential; and
- frame 3D data at least partially representative of the geometry and position of said spectacle frame with respect to said wearer referential;
- lens 3D data at least partially representative of the geometry of at least a peripheral portion of said ophthalmic lens; and
- a fitted position of said ophthalmic lens with respect to said wearer referential using said frame 3D data and said lens 3D data to fit said ophthalmic lens within said spectacle frame meeting a fitting criteria relating to the axial positioning of said ophthalmic lens with respect to said spectacle frame.

DETAILED DESCRIPTION OF EXAMPLE(S)

The following description, enriched with joint drawings that should be taken as non-limitative examples, will help understand the invention and figure out how it can be realized.

On the appended drawings:

FIG. 1 is a block diagram of the steps of an embodiment of the method according to the invention;

FIG. 2 shows an ophthalmic lens mounted on a spectacle frame positioned on the individual's head

Figure 3:
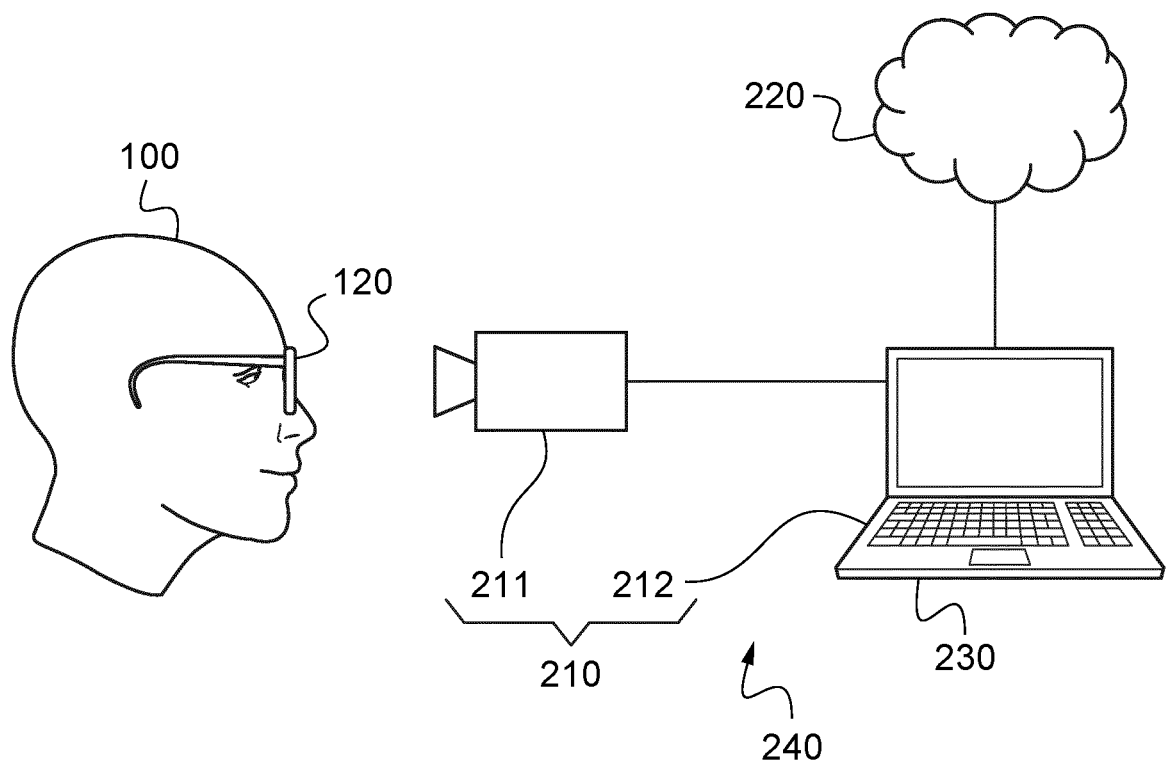
FIG. 3 shows a system adapted to implement the method according to the invention.

In order to manufacture eyeglasses for vision correction of a wearer 100, numerous parameters are taken into account.

Eyeglasses typically comprise a spectacle frame 120 and two ophthalmic lenses 130. In order to customize the ophthalmic lens 130 for a specific wearer 100, many geometrical and/or physiological and/or postural and/or behavioral parameters of the wearer 100 are determined. Some features of the spectacle frame 120 and/or some parameters relative to the placement of the spectacle frame 120 on the head of the wearer 100 may as well be taken into account.

The spectacle frame 120 is chosen by the wearer 100. The features of the ophthalmic lenses 130 are thus determined based on different parameters, including parameters relative to the chosen spectacle frame 120, parameters relative to the wearer 100, for example an interpupillary distance, and parameters linked to the relative position of the spectacle frame 120 on the face of the wearer 100, for example a fitting height. Those parameters are often referred to as geometrico-morphological parameters.

In this context, as shown in FIG. 1, the disclosure relates to a method for determining a fitted position of an ophthalmic lens 130 to be mounted on a spectacle frame 120 equipping a wearer 100. More precisely, the ophthalmic lens 130 is to be mounted on a rim 121 of the spectacle frame 120. The term "rim" refers to full rims or to half-rims.

The fitted position of the ophthalmic lens 130 is representative of an as-worn position when the ophthalmic lens 130 is actually mounted on the spectacle frame 120 chosen by the wearer 100. The fitted position is for example a set of 3D data comprising a list of points associated with the outer surface of the ophthalmic lens 130. Each point of this list has three coordinates defining its position in a referential XYZ linked to the head of the wearer 100. This list can comprise several sublists, for example one associated with a back optical surface 132 of the ophthalmic lens 130 which is the surface of the ophthalmic lens 130 facing the eye 110, one associated with a front optical surface 131 of the ophthalmic lens 130 which is the surface opposite to the back optical surface 132, and one associated with a peripheral edge 133 of the ophthalmic lens 130 which links the front optical surface 131 to the back optical surface 132. Those points provide a precise numerical 3D representation of the geometry and position of the ophthalmic lens 130 with respect to the head of the wearer 100. The more point there are, the more precise the 3D representation of the ophthalmic lens 130 is.

Thanks to the invention the fitted position can be determined very precisely.

Consequently, the fitted position can be used to implement a personalized lens design for the ophthalmic lens 130, for example by fine-tuning the front optical surface 131 and/or the back optical surfaces 132 of the ophthalmic lens 130 and/or calculating index gradients of the ophthalmic lens 130.

Here, what is called lens design are different features of the ophthalmic lens 130 such as the geometry of the front optical surface 131, the geometry of the back optical surface 132, the thickness of the ophthalmic lens 130, the material of the ophthalmic lens 130 or a refractive index of the ophthalmic lens 130. Once the ophthalmic lens 130 is positioned in front of the eye of the wearer 100, the lens design provides an optical design to the wearer.

Determining the lens design means determining at least one features of the ophthalmic lens 130, for instance the geometry the back optical surface 132, so that the optical design provided by the lens design equals or is very close to the optical design needed for the wearer 100.

In particular, determining the lens design can consist in optimizing parameters (the back optical surface 132 for instance) to minimize a difference between a current optical design and a needed optical design for the wearer 100.

More particularly, knowing the fitted position makes the lens design more independent of manual measurements of the fitting parameters.

To determine the fitting parameters, the wearer 100 is preferably in a sitting or standing position that is such that the wearer's 100 head is straight, i.e. the Frankfort plane PF associated with the wearer's head is substantially horizontal. Frankfort plane PF is defined as being the plane containing the bottom orbit point and the portion of the wearer 100, where the portion is the highest point in the skull of the acoustic meatus, which corresponds to the tragion of the ear. The wearer's gaze axis is the primary gaze axis, i.e. the wearer 100 is looking at the horizon straight ahead. It is also said that the wearer 100 is taking up an "orthostatic" position, a position requiring least effort.

As shown in FIG. 2, a sagittal plane SP is defined as being the vertical plane containing the right bisector between the two eyes 110. The right bisector between the eyes 110 is the axis passing through the middle of the segment defined by the centers of rotation CR of the two eyes 110 and parallel to the Frankfort plane PF. A face plane PP is also defined as being the vertical plane passing through the centers of rotation CR of the eyes 110 and orthogonal to the Frankfort plan PF.

These plans PF, SP, PP can be used to define the referential XYZ linked to the head of the wearer 100. A horizontal axis Oz is defined as an axis orthogonal to the face plan PP. A vertical axis Oy is defined as an axis orthogonal to the Frankfurt plan FP. A transversal axis Ox is defined as an axis orthogonal to the sagittal plan SP, so orthogonal to the latter two axes.

The reference point, linked to the head of the wearer 100, used to locate the referential XYZ in space could be any point of the face of the wearer 100. Preferably, the reference point is the center of rotation CR of the eye 110 in front of the ophthalmic lens 130. In this case, the horizontal axis Ox might correspond to the primary gaze axis.

The fitting parameters are here parameters allowing fitting the lens 130 in the frame 120, that is to say allowing to determine how to fit the lens 130 in the frame 120. This fitting is done according to wearer's needs. In other words, the fitting parameters are here parameters allowing positioning the ophthalmic lens 130 within the frame 120 with respect to the wearer, in particular with respect to its eye. The fitting parameters here also comprise the above-cited geometrico-morphological parameters which can be used to determine the position of the lens 130.

Usually, the fitting parameters comprise at least:
a face form angle representing a rotation of a mean plane of the ophthalmic lens 130 around the vertical axis Oy;
a pantoscopic angle representing a rotation of the mean plane of the ophthalmic lens 130 around the transversal axis Ox;
an eye-lens distance between the eye 110 and the back optical surface 132 of the ophthalmic lens 130.

Step a)

In step a), a fitting criteria relating to the axial positioning of the ophthalmic lens 130 with respect to the spectacle frame 120 is determined.

The axial positioning refers to a positioning of the ophthalmic lens 130 along an axis substantially orthogonal to a mean plan of the ophthalmic lens 130. For example, in FIG. 2, the axial positioning refers to the position of the ophthalmic lens 130 along the horizontal axis Oz. Generally, two distinct axial positionings are characterized by two distinct eye-lens distances.

Fitting criteria often refer to aesthetic considerations. For example, the eye care professional can adjust the axial positioning of the ophthalmic lens 130 so that the front optical surface 131 flushes with a front face 125 of the spectacle frame 120. The front face 125 of the spectacle frame 120 corresponds to the part of the rim 121 visible in front view (when looking at the face of the wearer 100 equipped with the spectacle frame 120). The face of the rim 121 opposite to the front face 125 is the back face 124 of the spectacle frame 120. Flushing the front optical surface 131 with the front face 125 of the spectacle frame 120 makes that no parts of the ophthalmic lens 130 is visible in front view. FIG. 2 shows an example of axial positioning where the above-described fitting criteria is respected.

Fitting criteria can also consist of providing a predetermined overflow of a front part of the peripheral edge 133 relative to the front face 125 of the spectacle frame 120. The front part of the peripheral edge 133 is a part of the peripheral edge 133 abutting with the front optical surface 131.

Step b)

In step b), frame 3D data, at least partially representative of the geometry and position of the spectacle frame 120 with respect to the wearer referential XYZ, are determined. In the context of the disclosure, frame 3D data are at least representative of the geometry and position of the rim 121.

The determination of the frame 3D data is performed using an input device 210. The input device 210 can comprise a measurement apparatus and/or a user interface. Here, as shown in FIG. 3, the input device 210 comprises an image capture apparatus 211 as the measurement apparatus and a computer 212 as the user interface. The computer 212 comprises at least one processor 230, programmed, for example, for image processing, and at least one memory.

The geometry of the spectacle frame 120 describes the outer surface of the spectacle frame 120, i.e. of the shape of the spectacle frame 120. The geometry of the spectacle frame 120 is intrinsic to the spectacle frame 120 chosen by the wearer 100.

Here, frame 3D data representative of the geometry of the spectacle frame 120 comprise a three-dimensional representation of the outer surface of the spectacle frame 120 (for example a mesh representation). This three-dimensional representation can consist of a list of points associated with the surface of the spectacle frame 120 where each point is defined by three coordinates characterizing their position relative to each other. Here, frame 3D data representative of the geometry of the spectacle frame 120 are contained in an electronic file and can be collected from a storage device, for example the memory of the computer 212, a distance server or a cloud 220. The eye care professional accesses the electronic file through the input device 210, here through the computer 212.

The geometry of the spectacle frame 120 can also be retrieved by performing a 3D scan of the spectacle frame 120 and by using image processing algorithms, for example using a smartphone as the image capture apparatus 211 of the input device 210 and dedicated applications. The eye care professional can perform this scan after the wearer 100 chooses the spectacle frame 130. This is particularly useful if the spectacle frame 130 does not come with an electronic file comprising frame 3D data representative of its geometry.

Frame 3D data representative of the geometry of the spectacle frame 120 can also comprise a set of parameters, such as lengths, angles, radius of curvature describing the geometry of the spectacle frame 120. Here again, these parameters can be contained in an electronic file associated with the spectacle frame 120 or they can be measured by the eye care professional himself.

The position of the spectacle frame 120 describes the location of the spectacle frame 120 within a specific referential. Thus, frame 3D data representative of the position of the spectacle frame 120 can comprise the coordinates of at least three points associated with the spectacle frame 120 in the specific referential, for example three points used to define the geometry of the spectacle frame 120. For example, frame 3D data representative of the position of the spectacle frame 120 comprise the coordinates of at least 100 points associated with the spectacle frame in the wearer referential XYZ.

The position of the spectacle frame 120 depends on the wearer 100 and therefore has to be determined after the wearer 100 chooses the spectacle frame 120.

Advantageously, frame 3D data representative of the position of the spectacle frame 120 are determined using 3D data of the wearer 100 equipped with the spectacle frame 120, acquired with a 3D scanner 211 used as the image capture apparatus 211 of the input device 210. The 3D scanner 211 can be a smartphone, as already described, or a dedicated device if more precision is needed. Such a 3D scan allows determining the shape and relative position of the spectacle frame 120 and of part of the wearer's 100 face. The geometry of the spectacle frame 120 is then determined by the processor 230, for example by image processing or deep learning, directly in the wearer referential XYZ. In this embodiment, frame 3D data representative of the position of the spectacle frame 120 can comprise as many points as frame 3D data representative of the geometry of the spectacle frame 120. In other words, the positions of the points associated with the surface of the spectacle frame 120 are determined relative to each other and with respect to the wearer referential XYZ.

Moreover, from the data describing the part of the wearer's 100 face, it is possible to retrieve the position of the center of rotation CR of the eye 110. Therefore, as shown in FIG. 2, the center of rotation CR of the eye 110 can be used as the origin of the referential XYZ linked to the head of the wearer. According to this alternative, the position of the spectacle frame 120 is determined with respect to the center of rotation CR of the eye 110.

As a variation, the geometry and the position of the spectacle frame 120 could be determined using localization means clipped on the spectacle frame 120 and an image capture apparatus. Such localization means carry predetermined patterns allowing to determine easily their position and their orientation.

In a possible embodiment, frame 3D data include groove 3D data at least partially representative of the geometry and position of a spectacle frame groove 122 provided inside the rim 121. The geometry of the spectacle frame groove 122 describes the shape of the surface which defines a recess in the rim 121 of the spectacle frame 120. The position of the spectacle frame groove 122 describes the location of the recess on a circular inner surface 126 of the rim 121. The position of the spectacle frame groove 122 mainly describes an axial positioning. In FIG. 2, the axial positioning mainly refers to the position of the spectacle frame groove 122 along the horizontal axis Oy. The axial positioning describes whether the spectacle frame groove 122 is closer to the front face 125 of the spectacle frame 120 or the back face 124 of the spectacle frame 120. In FIG. 2, the spectacle frame groove 122 is located substantially in the middle between the face surface 125 and the back surface 124 of the rim 122.

Here, groove 3D data comprise a three-dimensional representation of the surface which defines the recess in the rim 121. This three-dimensional representation can consist of a list of points associated with the surface which defines the recess in the rim 121 where each point is defined by three coordinates in a referential linked to the spectacle frame 120. Groove 3D data are intrinsic to the spectacle frame 120; they do not depend on the wearer 100. Groove 3D data can be determined by a 3D scan in the same way as frame 3D data.

In an embodiment, groove 3D data representative of the position of the spectacle frame groove 122 are retrieved as a function of a default offset or a spectacle frame thickness. Indeed, the spectacle frame groove 122 might be difficult to detect by image processing as it is relatively small compared with the spectacle frame 120 itself. Such an estimation is a good trade-off between the precision on the position of the spectacle frame groove 122 and the needed time and effort to measure the spectacle frame groove 122.

For example, the position of the spectacle frame groove 122 can be estimated at half the spectacle frame thickness. For example, the spectacle frame groove 122 can be estimated to be at equidistance between the front face 125 and the back face 124 of the spectacle frame 120.

Frame 3D data, possibly including groove 3D data, can also be determined with two distinct 3D scans, one of the spectacle frame 120 alone and another of the face of the wearer 100 not equipped with the spectacle frame 120. The determination is done by a virtual adjustment (virtual try on).

Step c)

In step c), lens 3D data representative of the geometry of at least a peripheral portion 140 of the ophthalmic lens 130, are determined.

The peripheral portion 140 of the ophthalmic lens 130 comprises the peripheral edge 133 of the ophthalmic lens 130. The peripheral portion 133 of the ophthalmic lens 130 can also comprise annular peripheral outer parts of the front optical surface 131 and the back optical surfaces 132, which are in contact with the peripheral edge 133.

The geometry of the peripheral portion 140 describes the outer surface of the peripheral portion 140.

In addition, lens 3D data are representative of the geometry of the front optical surface 131 and of the back optical surface 132. Thus, lens 3D data comprise information on the curvature of each optical surface 131, 132.

Here, lens 3D data representative of the geometry of the ophthalmic lens 130 comprise a three-dimensional representation of the outer surface of the ophthalmic lens 130 (for example a mesh representation) or at least of the peripheral portion 140. This three-dimensional representation can consist of a list of points associated with the surface of the ophthalmic lens 130 or at least of the peripheral portion 140 where each point is defined by three coordinates characterizing their position relative to each other.

One way to determine the geometry of at least a peripheral portion 140 of the ophthalmic lens 130 is to use a database accessible thought the input device 210. Here, the database is located on the cloud 220. The database comprises a variety of lens designs, materials, front base curves or diameters. For a selected refractive power and/or material of the ophthalmic lens, the database provides an estimation of the geometry of the ophthalmic lens 130. This database could be sampled through a range of refractive power of interest, for example every 0.5 diopters. In addition, it may also be possible to select a front base curve among a set of available front base curves (the geometry of the front optical surface 131 and/or the back optical surface 132 would depend on the selected front base curve). The database can store geometry of lenses as mesh representation including mesh representations of the front optical surface 131, of the back optical surface 132 and of the peripheral edge 133.

Given the spectacle frame 120 chosen by the wearer 100, the eye care professional can select a lens design, a material and a diameter as a function of a target refractive power. The target refractive power is previously estimated during a refractive test. For a given target refractive power, the closest refractive power in the database is selected. This selection may be driven by practical reasons such as having a minimum diameter ensuring that the ophthalmic lens 130 covers the whole inner surface of the rim 121.

As a variation, lens 3D data could be determined by simulating an ophthalmic lens. The simulation could be based on the target refractive power as well as an estimation of fitting parameters (eye-lens distance, pantoscopic angle, face form angle).

The determination of the geometry of at least a peripheral portion 140 of the ophthalmic lens 130 also takes into account the interpupillary distance (distance between the centers of the pupils), the fitting heights (distance between the center of the pupil and the bottom edge of rim 121) or the mounting cross (point of the ophthalmic lens 130 that should be located facing the pupil).

In a possible embodiment, the geometry and the position of a bevel 134 provided on the peripheral edge 133 of the ophthalmic lens 130 are determined. Data representative of the geometry and of the position of the bevel 134, with respect to the ophthalmic lens 130, are comprised in a data set called bevel 3D data.

The geometry of the bevel 134 describes the outer surface of the projection forming the bevel 134. For example, the bevel 134 can be V-shaped or rectangular-shaped. The geometry of the bevel 134 also describes the way the bevel 134 extends around the ophthalmic lens 130; the bevel 134 could be for example straight-lined or curved.

The position of the bevel 134 describes the location of the bevel on the peripheral edge 133, i.e. with respect to a referential linked to the ophthalmic lens 130. In particular, the position of the bevel 134 describes the distance between the bevel 134 and the front optical surface 131 and/or the back optical surface 132. Determining bevel 3D data is performed taking into account three main pieces of data: a front base curve of the ophthalmic lens 130, a thickness of the peripheral edge 133 and a spectacle frame base curve (which can be calculated from the frame 3D data). In addition, predefined rules (automatic mode on edging machines for example) or choices of the eye care professional can be taken into account during the determination of the bevel 3D data.

For instance, the position of the bevel 134 may be defined as being equally distant from the front optical surface 131 and the back optical surface 132, or being at fixed distance from the front optical surface 131.

Step d)

In step d), the fitted position of the ophthalmic lens 130 is determined with respect to the wearer referential XYZ using frame 3D data and lens 3D data to fit the ophthalmic lens 130 within the spectacle frame 120 meeting the fitting criteria.

The processor 230 is programmed to implement a numerical method wherein the ophthalmic lens 130 is fitted within the spectacle frame 120. Here, as shown in FIG. 3, the processor 230 is located in the computer 212 of the input device 210.

Using frame 3D data representative of the geometry of the spectacle frame 120 in the one hand and lens 3D data representative of the geometry at least a peripheral portion 140 of the ophthalmic lens 130 in the other hand, the processor 230 is programmed to simulate an optical system describing the relative position of the ophthalmic lens 130 with respect the spectacle frame 120. This simulation is conceivable as the geometry of the peripheral portion 140 of the ophthalmic lens 130 has been determined such that the ophthalmic lens 130 fits in the rim 121 of the spectacle frame 120.

Then, the axial position of the ophthalmic lens 130 is numerically adjusted in order to meet the fitting criteria. For example, the axial position of the ophthalmic lens 130 is adjusted such that the front optical surface 131 of the ophthalmic lens 130 flushes with the front face 125 of the spectacle frame 120.

In this first adjustment step, the processor 230 determines the position of at least the peripheral portion 140 of the ophthalmic lens 130 with respect to the spectacle frame 120. Since frame 3D data are representative of the position of the spectacle frame 120 with respect the wearer referential XYZ (this position is determined in step b), the processor 230 can determines the position of the peripheral portion 140 with respect to the wearer referential XYZ.

Then, the processor 230 determines the fitted position of the ophthalmic lens 130 based on the position of the peripheral portion 140 with respect to the wearer referential XYZ. Indeed, determining the position of the peripheral portion 140 of the ophthalmic lens 130 is sufficient to locate of the whole ophthalmic lens 130, especially to locate the front optical surface 131 and of the back optical surface 132.

Moreover, according to a possible embodiment, the front optical surface 131 and of the back optical surface 132 can be determined with respect to the center of rotation CR of the eye 110, which makes the lens design of the ophthalmic lens 130 more accurate. Indeed, in this embodiment, the position of the center of rotation CR of the eye 110 is determined accurately in step b) by image processing (rather than using an average position of the eye rotation center with respect the cornea).

In possible embodiments where frame 3D data include groove 3D data and lens 3D data include bevel 3D data, fitting the ophthalmic lens 130 within said spectacle frame 120 also takes into account fitting the bevel 134 within the spectacle frame groove 122.

This numerical adjustment can be performed by the processor 230 using an optimization procedure. An initial position of the bevel 134 with respect to the wearer referential XYZ is determined and included into the bevel 3D data. This initial position can take into account the first adjustment step. A cost function describing the distance between the spectacle frame groove 122 and the bevel 134 is defined using groove 3D and bevel 3D data. Minimizing this cost function is one way to estimate how the bevel 134 engages in the spectacle frame groove 122 when the ophthalmic lens 130 is mounted on the spectacle frame 120.

Minimizing this cost function, for example in the least square sense, gives the position of the bevel 134 with respected to the spectacle frame 120. Since the position of the bevel 134 with respect to the peripheral edge 133 of the ophthalmic lens 130 is already determined (step c) and since the position of the spectacle frame 120 with respect to the wearer referential XYZ is already determined (step b), the processor 230 can determine a position of the peripheral edge 133 of the ophthalmic lens 130 with respect the wearer referential XYZ.

Then, the fitted position of the ophthalmic lens 130 is determined. Indeed, the geometry of the peripheral portion 140 allows determining the position of the peripheral portion 140 relative to the spectacle frame 120 and so to the wearer referential XYZ. Thus, the geometry of the peripheral portion 140 allows determining the position of the fitted position of the ophthalmic lens 130 relative to the wearer referential XYZ, so here to determine for example the position the front optical surface 131 and the back optical surface 132 relative to the wearer referential XYZ.

From the fitted position of the ophthalmic lens 130, the processor 230 can determine, based on the curvature of the ophthalmic lens 130, the mean plan of the ophthalmic lens 130 in the wearer referential XYZ. The mean plan is then used to define the face form angle and the pantoscopic angle.

Here, the mean plan is defined as the plan tangent to the back optical surface at the boxed center of the ophthalmic lens 130. The boxed center is the center of the smallest horizontal rectangle in which the ophthalmic lens 130 is comprised. Usually, in as-worn conditions, the boxed center is located slightly under the intersection of the ophthalmic lens 130 with the primary gaze axis.

Moreover, the fitted position of the ophthalmic lens 130 allows determining with good accuracy a value of the distance between the eye rotation center CR and the back optical surface 132. Specifically, from the fitted position of the ophthalmic lens 130, the processor 230 can determine a value of the distance between the eye rotation center CR and the back optical surface 132 along the primary gaze axis, which is commonly referred to as the eye rotation center distance.

In this way, from the fitted position of the ophthalmic lens 130, values of the fittings parameters in as-worn conditions are determined with good accuracy. These values are referred to as refined values of the fitting parameters.

Thanks to the fitted position of the ophthalmic lens 130, one, for example the eye care professional or a lens manufacturer, can determine a personalized lens design for the wearer 100 for example by determining the geometry of the back optical surface 132 and/or the front optical surface 131, in order to reach the optical design. The lens design is determined so that the ophthalmic lens 130 provides the wearer 100 with the wanted optical design.

For instance, the determination of the lens design can take into account the geometry of the front optical surface 131, that can be a spherical surface having a fixed base curve, while optimizing the back optical surface 132 relative the wearer referential XYZ. The determination of the lens design can also take into account the refined values of the fitting parameters, for example of the eye-lens distance, of the face form angle, and of the pantoscopic angle. The determination of the lens design can also take into account the position of the rotation center CR of the eye 110 in the wearer referential XYZ.

In this way, the determination of the lens design can comprise the optimization of the back optical surface 132, taking into account the fixed front base curve, the refined value of the fitting parameters and the position of the rotation center CR of the eye 110.

Moreover, a refined value of a fitting parameter can be determined based on the lens design at least partially representative of the geometry of an optical surface 131, 132 of the ophthalmic lens 130. For example, the eye-lens distance can be determined based on the optimized back optical surface 132, i.e. with the information on the curvature of the ophthalmic lens 130. In other words, a value or a refined value of a fitting parameter can be updated, i.e. re-calculated with a better accuracy, once the lens design has been determined.

Furthermore, the fitted position of the ophthalmic lens 130 can be used to update lens 3D data representative of the geometry of the ophthalmic lens 130. Indeed, the personalized lens design can be used to re-estimate the geometry of the ophthalmic lens 130 which was determined in step c).

For instance, when the lens design comprises optimizing the back optical surface 132, the fitted position of the ophthalmic lens 130 determined in step d) can be updated using the optimized back surface 132.

In this way, it is possible to build an iterative process to determine a second fitted position of the ophthalmic lens 130 based on updated lens 3D data. Indeed, from the updated lens 3D data, the process of determining a fitted position of the ophthalmic lens 130 described in step d) can be performed again to determine a second fitted position of the ophthalmic lens 130.

From this second fitted position, second refined values of the fitting parameters can be determined. This second fitted position can also be used to re-estimate the geometry of the ophthalmic lens 130 in order to update again lens 3D data, and therefore to refine again the values of the fitting parameters.

This iterative process can be repeated as many times as needed. For example, the iterative process can be stopped when the values of the fitting parameters converge, i.e. when the difference between refined values of fitting parameters between two iterations is smaller than a threshold.

In other words, step a) and step b) are performed once and a loop consisting of step c) and step d) is performed as many times as needed.

The invention also relates to a system 240, presented in FIG. 3, for determining a fitted position of an ophthalmic lens 130 to be mounted on a spectacle frame 120 equipping a wearer 100, the fitted position being defined with respect to a wearer referential XYZ linked to the head of the wearer 100, comprising:
  an input device 210 adapted to determine frame 3D data at least partially representative of the geometry and position of the spectacle frame 120 with respect to said wearer referential XYZ; and lens 3D data at least partially representative of the geometry of at least a peripheral portion 140 of the ophthalmic lens 130; and
  a processor 230 programmed to implement any embodiment of the method according to the present disclosure.

In particular, the processor 230 is programmed to determine the fitted position of the ophthalmic lens 130 with respect to the wearer referential XYZ using the frame 3D data and the lens 3D data to fit the ophthalmic lens 130 within the spectacle frame 120 meeting a fitting criteria relating to the axial positioning of the ophthalmic lens 130 with respect to the spectacle frame 120.

In an embodiment of the system 240:
  the input device 210 is further adapted to determine the position of the rotation center CR of the eye 110 of the wearer 100 with respect to the wearer referential XYZ; and
  the processor 230 is further programmed to determine a lens design of the ophthalmic lens 130 based on the fitted position of the ophthalmic lens 130 with respect to the wearer referential XYZ and the position of the rotation center CR of the eye 110 is used for determining the lens design of the ophthalmic lens 130.

Once the lens design is determined, for example using the system 240 comprising the input device 210 and the processor 230, the eye care professional can manufacture the ophthalmic lens 130 to be fitted on the spectacle frame 120 chosen by the wearer 100. The eye care professional could also order the ophthalmic lens 130 specifying the lens design to achieve.

In this way, the invention also relates to an ophthalmic lens 130 to be fitted on a spectacle frame 120 adapted to be disposed on the head of a wearer 100, in front of the eye 110 of the wearer 100, wherein the determination of at least one geometrical or optical parameter of the ophthalmic lens 130 is based on:
  a position of a rotation center CR of the eye 110 of the wearer 100 with respect to the referential XYZ;
  frame 3D data at least partially representative of the geometry and position of the spectacle frame 120 with respect to the wearer referential XYZ;
  lens 3D data at least partially representative of the geometry of at least a peripheral portion 140 of the ophthalmic lens 130; and
  a fitted position of the ophthalmic lens 130 with respect to the wearer referential XYZ using the frame 3D data and the lens 3D data to fit the ophthalmic lens 130 within the spectacle frame 120 meeting a fitting criteria relating to the axial positioning of the ophthalmic lens 130 with respect to the spectacle frame 120.

The invention claimed is:

1. A computer-implemented method for determining a fitted position of an ophthalmic lens to be mounted on a spectacle frame equipping a wearer, said spectacle frame comprising a rim fitted with said ophthalmic lens, said fitted position being defined with respect to a wearer referential linked to the head of the wearer, said method comprising steps of:
  defining at least one fitting criteria relating to the positioning of said ophthalmic lens with respect to said spectacle frame;
  determining frame 3D data at least partially representative of a geometry and position of said spectacle frame with respect to said wearer referential, said frame 3D data including groove 3D data at least partially representative of the geometry and position of a spectacle frame groove provided inside said rim;
  determining lens 3D data at least partially representative of the geometry of at least a peripheral portion of said ophthalmic lens, said lens 3D data including bevel 3D data at least partially representative of the geometry and position of a bevel provided on a peripheral edge of said ophthalmic lens; and
  determining said fitted position of said ophthalmic lens with respect to said wearer referential using said frame 3D data and said lens 3D data to fit said ophthalmic lens within said spectacle frame meeting said fitting criteria and using said groove 3D data and said bevel 3D data for fitting said bevel within said spectacle frame groove.

2. The method according to claim 1, wherein said groove 3D data are retrieved as a function of a default offset or a spectacle frame thickness inside said spectacle frame rim.

3. The method according to claim 1, wherein said bevel 3D data are determined based on at least one of the following parameters: a front base curve of the ophthalmic lens, a thickness of the peripheral edge of the ophthalmic lens and a spectacle frame base curve.

4. The method according to claim 1, wherein said at least one fitting criteria comprises one of the following:
  flushing a front optical surface of said ophthalmic lens with a front face of the spectacle frame;

providing a predetermined overflow of the peripheral edge of the ophthalmic lens relative to the front face of the spectacle frame.

5. The method according to claim 1, wherein said frame 3D data are determined using 3D data, acquired with a 3D scanner, of the wearer equipped with said spectacle frame.

6. A method for determining a lens design of an ophthalmic lens adapted to correct the vision of a wearer, said method comprising the steps of:
  determining a fitted position of said ophthalmic lens to be mounted on a spectacle frame equipping the wearer with a method according to claim 1; and
  determining said lens design based on said fitted position of the ophthalmic lens with respect to said wearer referential.

7. The method according to claim 6, wherein said lens design is at least partially representative of a geometry of an optical surface of said ophthalmic lens and a refined value of at least one fitting parameter is determined based on said lens design.

8. The method according to claim 6, wherein said lens design is determined based on at least one of the following: an eye-lens distance, a face form angle, and a pantoscopic angle.

9. The method according to claim 6, further comprising a step of determining the position of the rotation center of the eye of the wearer with respect to said wearer referential, wherein said position of the rotation center of the eye is used for determining said lens design of said ophthalmic lens.

10. The method according to claim 9, wherein the determination of the position of the rotation center of said eye of the wearer with respect to said wearer referential is determined using a 3D data, acquired with a 3D scanner, of the wearer's face.

11. The method according to claim 1, wherein said lens 3D data are updated based on a lens design and wherein a second fitted position of the ophthalmic lens is determined based on the updated lens 3D data, this updating operation being repeated so as to build an iterative process.

12. A system for determining a fitted position of an ophthalmic lens to be mounted on a spectacle frame equipping a wearer, said spectacle frame comprising a rim fitted with said ophthalmic lens, said fitted position being defined with respect to a wearer referential linked to the head of the wearer, comprising:
  an input device adapted to determine:
    frame 3D data at least partially representative of a geometry and position of said spectacle frame with respect to said wearer referential, said frame 3D data including groove 3D data at least partially representative of the geometry and position of a spectacle frame groove provided inside said rim, and
    lens 3D data at least partially representative of geometry of at least a peripheral portion of said ophthalmic lens, said lens 3D data including bevel 3D data at least partially representative of the geometry and position of a bevel provided on a peripheral edge of said ophthalmic lens; and
  a processor programmed to determine said fitted position of said ophthalmic lens with respect to said wearer referential using said frame 3D data and said lens 3D data to fit said ophthalmic lens within said spectacle frame meeting a fitting criteria relating to an axial positioning of said ophthalmic lens with respect to said spectacle frame and using said groove 3D data and said bevel 3D data for fitting said bevel within said spectacle frame groove.

13. The system according to claim 12, wherein:
  the input device comprises an image capture apparatus and is further adapted to determine the position of the rotation center of said eye of the wearer with respect to said wearer referential; and
  the processor is further programmed to determine a lens design of the ophthalmic lens based on said fitted position of the ophthalmic lens with respect to said wearer referential and the position of the rotation center of the eye is used for determining said lens design of said ophthalmic lens.

* * * * *